(12) United States Patent
Ko et al.

(10) Patent No.: US 11,233,617 B2
(45) Date of Patent: *Jan. 25, 2022

(54) NPRS TRANSMISSION METHOD AND DEVICE THEREFOR

(71) Applicant: LG ELECTRONICS INC., Seoul (KR)

(72) Inventors: Hyunsoo Ko, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

This patent is subject to a terminal disclaimer.

(21) Appl. No.: 16/863,816

(22) Filed: Apr. 30, 2020

(65) Prior Publication Data
US 2020/0259617 A1 Aug. 13, 2020

Related U.S. Application Data

(63) Continuation of application No. 16/320,452, filed as application No. PCT/KR2017/008115 on Jul. 27, 2017, now Pat. No. 10,680,777.

(Continued)

(51) Int. Cl.
*H04W 4/00* (2018.01)
*H04L 5/00* (2006.01)
(Continued)

(52) U.S. Cl.
CPC .............. *H04L 5/0051* (2013.01); *H04L 5/00* (2013.01); *H04L 27/2607* (2013.01);
(Continued)

(58) Field of Classification Search
None
See application file for complete search history.

(56) References Cited

U.S. PATENT DOCUMENTS 9,960,830 B2 5/2018 You et al.
10,680,777 B2 6/2020 Ko et al.
(Continued)

FOREIGN PATENT DOCUMENTS

CN 103221838 7/2013
CN 103329604 9/2013
(Continued)

OTHER PUBLICATIONS

U.S. Appl. No. 16/320,452, Notice of Allowance dated Feb. 11, 2020, 17 pages.
(Continued)

*Primary Examiner* — Gerald A Smarth
(74) *Attorney, Agent, or Firm* — Lee, Hong, Degerman, Kang & Waimey PC

(57) ABSTRACT

In the transmission of a narrowband positioning reference signal (NPRS), by a base station, in a cellular mobile communication system supporting narrowband-Internet of Things (NB-IoT), the base station transmits an NPRS by using a predetermined part of a sequence defined by a generation formula, which is the same as a positioning reference signal (PRS) generation formula, and when a PRS and the NPRS are transmitted through the same cell, the base station transmits, to a terminal, information indicating whether the PRS and the NPRS can be used together.

15 Claims, 7 Drawing Sheets

Related U.S. Application Data

(60) Provisional application No. 62/371,849, filed on Aug. 8, 2016, provisional application No. 62/400,626, filed on Sep. 28, 2016, provisional application No. 62/452,390, filed on Jan. 31, 2017, provisional application No. 62/454,057, filed on Feb. 3, 2017, provisional application No. 62/457,180, filed on Feb. 10, 2017.

(51) Int. Cl.
  *H04W 64/00*  (2009.01)
  *H04W 4/80*  (2018.01)
  *H04L 27/26*  (2006.01)
  *H04W 24/10*  (2009.01)
  *H04W 72/04*  (2009.01)
  *H04W 88/06*  (2009.01)
  *H04W 88/10*  (2009.01)

(52) U.S. Cl.
  CPC .............. *H04W 4/80* (2018.02); *H04W 24/10* (2013.01); *H04W 64/00* (2013.01); *H04W 64/003* (2013.01); *H04W 72/0446* (2013.01); *H04W 88/06* (2013.01); *H04W 88/10* (2013.01); *H04L 5/0007* (2013.01)

(56) References Cited

U.S. PATENT DOCUMENTS

| | | | |
|---|---|---|---|
| 10,736,113 B2 * | 8/2020 | Wang | .................. H04L 5/005 |
| 2011/0176440 A1 | 7/2011 | Frank et al. | |
| 2012/0027110 A1 | 2/2012 | Han et al. | |
| 2012/0122472 A1 | 5/2012 | Krishnamurthy et al. | |
| 2014/0112261 A1 | 4/2014 | Chen et al. | |
| 2017/0180095 A1 | 6/2017 | Xue et al. | |
| 2017/0201362 A1 * | 7/2017 | Park | .................. H04L 5/0048 |
| 2017/0208592 A1 * | 7/2017 | Alvarino | .............. H04L 5/0048 |
| 2017/0273026 A1 | 9/2017 | Fakoorian et al. | |
| 2017/0289831 A1 | 10/2017 | Park et al. | |
| 2017/0374640 A1 | 12/2017 | Kim et al. | |
| 2018/0098187 A1 | 4/2018 | Blankenship et al. | |
| 2018/0213599 A1 | 7/2018 | Kazmi et al. | |
| 2018/0248735 A1 | 8/2018 | Zhang et al. | |
| 2018/0287761 A1 | 10/2018 | You et al. | |
| 2018/0375626 A1 | 12/2018 | Kim et al. | |
| 2019/0045553 A1 * | 2/2019 | Zhang | ................... H04L 5/0048 |

FOREIGN PATENT DOCUMENTS

| | | |
|---|---|---|
| WO | 2016032200 | 3/2016 |
| WO | 2016032308 | 3/2016 |
| WO | 2016093662 | 6/2016 |

OTHER PUBLICATIONS

Japan Patent Office Application No. 2019-507156, Office Action dated Mar. 31, 2020, 3 pages.
Wi rapporteur (Ericsson), "RAN1 agreements for Rel-13 NB-IoT", R1-163943, 3GPP TSG-RAN WG1 Meeting #84bis, Apr. 2016, 28 pages.
U.S. Appl. No. 16/324,099, Final Office Action dated Aug. 19, 2020, 16 pages.
U.S. Appl. No. 16/324,099, Notice of Allowance, dated Apr. 1, 2021, 17 pages.
U.S. Appl. No. 62/308,581, dated Mar. 15, 2016.
The State Intellectual Property Office of the People's Republic of China Application Serial No. 201780048283.9, Office Action dated Dec. 1, 2020, 9 pages.
Intel Corporation, "Considerations on Positioning support for NB-IoT," 3GPP TSG-RAN WG2 NB-IOT, R2-160448, Jan. 2016, 4 pages.
European Patent Office Application Serial No. 17839699.0, Search Report dated Jan. 31, 2020, 10 pages.
Ericsson, "Text Proposal and Discussion on Further enhancement for OTDOA", R1-153744, 3GPP TSG RAN WG1 Meeting #82, Aug. 2015, 9 pages.
Huawei et al., "Evaluation and discussion on OTDOA enhancements", R1-153222, 3GPP TSG RAN WG1 meeting #81, May 2015, 7 pages.
U.S. Appl. No. 16/324,099, Office Action dated Mar. 5, 2020, 19 pages.
PCT International Application No. PCT/KR2017/008115, Written Opinion of the International Searching Authority dated Nov. 22, 2017, 18 pages.
PCT International Application No. PCT/KR2017/008116, Written Opinion of the International Searching Authority dated Nov. 6, 2017, 25 pages.
3rd Generation Partnership Project (3GPP), "Technical Specification Group Radio Access Network; Evolved Universal Terrestrial Radio Access (E-UTRA); Physical channels and modulation (Release 13)," 3GPP TS 36.211 V13.2.0, Jun. 2016, 168 pages.
Ericsson, "TP-specific PRS sequence generation for indoor positioning", 3GPP TSG RAN WG1 Meeting #85, R1-163976, May 2016, 3 pages.
3rd Generation Partnership Project (3GPP), "Technical Specification Group Radio Access Network; Evolved Universal Terrestrial Radio Access (E-UTRA); Physical layer procedures (Release 13)," 3GPP TS 36.213 V13.2.0, Jun. 2016, 381 pages.
Ericsson, "New WI proposal for Improved eMTC and NB-IOT Positioning in LTE", 3GPP TSG RAN Meeting #71, RP-160199, Mar. 2016, 6 pages.
Vodafone, et al., "Narrowband IoT", 3GPP TSG RAN Meeting #72, RP-160932, Jun. 2016, 45 pages.

* cited by examiner

NPRS TRANSMISSION METHOD AND DEVICE THEREFOR

CROSS-REFERENCE TO RELATED APPLICATIONS

This application is a continuation of U.S. patent application Ser. No. 16/320,452, filed on Jan. 24, 2019, which is the National Stage filing under 35 U.S.C. 371 of International Application No. PCT/KR2017/008115, filed on Jul. 27, 2017, which claims the benefit of U.S. Provisional Application No. 62/371,849, filed on Aug. 8, 2016, 62/400,626, filed on Sep. 28, 2016, 62/452,390, filed on Jan. 31, 2017, 62/454,057, filed on Feb. 3, 2017, and 62/457,180, filed on Feb. 10, 2017, the contents of which are all hereby incorporated by reference herein in their entirety.

TECHNICAL FIELD

The present invention relates to narrow band communication for supporting Internet of Things (IoT) in a next generation wireless communication system, and more particularly, to a method for transmitting a narrowband positioning reference signal (NPRS) used for narrowband IoT communication and a device therefor.

BACKGROUND ART

Recently, demand for IoT technology has increased and narrowband IoT (NB-IoT) technology has been discussed in order to support such an IoT service. NB-IoT seeks to provide appropriate throughput between connected apparatuses despite low apparatus complexity and low power consumption.

In 3GPP of the NB-IoT standards, NB-IoT technology capable of being combined with other 3GPP technologies such as GSM, WCDMA or LTE has been studied. To this end, a resource structure which will be used from the viewpoint of a legacy system has been discussed.

FIG. 1 is a diagram illustrating three modes which may be used in NB-IoT.

In order to satisfy the above-described demand, in NB-IoT, a channel bandwidth of 180 kHz is being considered for use both on uplink and downlink, which corresponds to one physical resource block (PRB) in an LTE system.

As shown in FIG. 1, NB-IoT may support three modes such as standalone operation, guard band operation and inband operation. In particular, in the inband mode shown in the lower side of FIG. 1, NB-IoT operation may be performed through a specific narrowband in an LTE channel bandwidth.

In addition, in NB-IoT, using an extended DRX cycle, half-duplex FDD (HD FDD) operation and a single receive antenna in a wireless apparatus substantially reduces power and cost.

DISCLOSURE

Technical Problem

It is preferable to provide transmission of a positioning reference signal (PRS) to support an operation of the NB IoT described as above. To this end, it is required to discuss how to configure a PRS in the legacy LTE operation and a PRS for the operation of the NB IoT, how to define a detailed transmission method, and how to define a relation with another RS for the operation of the NB IoT.

Technical Solution

To achieve the object of the present invention, a method for transmitting a narrowband positioning reference signal (NPRS) from a base station in a cellular mobile communication system supporting narrowband-Internet of Things (NB-IoT) according to one aspect of the present invention comprises transmitting a positioning reference signal (PRS) by using a sequence defined by a first equation; transmitting the NPRS by using a predetermined part of the sequence defined by the first equation; and transmitting, to a UE, information indicating whether the PRS and the NPRS can be used together when the PRS and the NPRS are transmitted through the same cell.

The NPRS may be transmitted using a predetermined part determined in accordance with a physical resource block (PRB) of the sequence, which includes the NPRS, if the cell is operated in an in-band mode, and the NPRS may be transmitted using a predetermined part determined regardless of a position of the PRB which includes the NPRS if the cell is operated in a stand-alone mode.

The NPRS may be transmitted per symbol by extracting two components of the sequence.

The method may further comprise transmitting position information of the PRB, which includes the NPRS, to the UE.

The NPRS may be transmitted per symbol from a first symbol of a first subframe if the cell is operated in a stand-alone mode or a guard band mode, and the NPRS may be transmitted from a symbol except first one or more predetermined number of symbols of a second subframe if the cell is operated in an in-band mode.

When a frequency domain position to which the NPRS is transmitted is k, $k=6m+(6-l+v_{shift}) \bmod 6$ is satisfied, where m is 0 or 1, l denotes a symbol index to which the NPRS is transmitted, and $v_{shift}$ may be determined based on ID of a cell to which the NPRS is transmitted.

The first equation may be a pseudo-random sequence generation equation in which an initial value is determined by an identifier of the cell.

In another aspect of the present invention, a method for receiving a narrowband positioning reference signal (NPRS) by a user equipment (UE) from a base station in a cellular mobile communication system supporting narrowband-Internet of Things (NB-IoT) comprises receiving, from the base station, a positioning reference signal (PRS) corresponding to a sequence defined by a first equation; receiving, from the base station, the NPRS corresponding to a predetermined part of the sequence defined by the first equation; and performing position estimation by using the PRS and the NPRS if information indicating that the PRS and the NPRS can be used together is received from the base station.

The NPRS may be received using a predetermined part determined in accordance with a physical resource block (PRB) of the sequence, which includes the NPRS, if the cell is operated in an in-band mode, and the NPRS may be transmitted using a predetermined part determined regardless of a position of the PRB which includes the NPRS if the cell is operated in a stand-alone mode.

The NPRS may correspond to two components of the sequence, and may be transmitted per symbol.

The method may further comprise receiving position information of the PRB, which includes the NPRS, from the base station.

The NPRS may be transmitted per symbol from a first symbol of a first subframe if the cell is operated in a stand-alone mode or a guard band mode, and the NPRS may be transmitted per symbol from a symbol except first one or more predetermined number of symbols of a second subframe if the cell is operated in an in-band mode.

When a frequency domain position to which the NPRS is transmitted is k, $k=6m+(6-l+v_{shift})\mod 6$ is satisfied, where m is 0 or 1, 1 denotes a symbol index to which the NPRS is transmitted, and may be determined based on ID of a cell to which the NPRS is transmitted.

In still another aspect of the present invention, a base station for transmitting a narrowband positioning reference signal (NPRS) in a cellular mobile communication system supporting narrowband-Internet of Things (NB-IoT) comprises a processor configured to configure a positioning reference signal (PRS) by using a sequence defined by a first equation and configure the NPRS by using a predetermined part of the sequence defined by the first equation; and a transceiver configured to transmit the PRS and the NPRS to one or more user equipments (UEs), wherein the processor is configured to transmit, to the UE, information indicating whether the PRS and the NPRS can be used together, through the transceiver when the PRS and the NPRS are transmitted through the same cell.

In further still another aspect of the present invention, a user equipment (UE) for receiving a narrowband positioning reference signal (NPRS) from a base station in a cellular mobile communication system supporting narrowband-Internet of Things (NB-IoT) comprises a transceiver configured to receive, from the base station, a positioning reference signal (PRS) corresponding to a sequence defined by a first equation and receive, from the base station, the NPRS corresponding to a predetermined part of the sequence defined by the first equation; and a processor configured to perform position estimation by using the PRS and the NPRS if information indicating that the PRS and the NPRS can be used together is received from the base station through the transceiver.

Advantageous Effects

According to the present invention described as above, an NPRS for an operation of NB IoT may be transmitted or received more efficiently in a next generation wireless communication system.

BEST MODE FOR CARRYING OUT THE INVENTION

Figure 1:
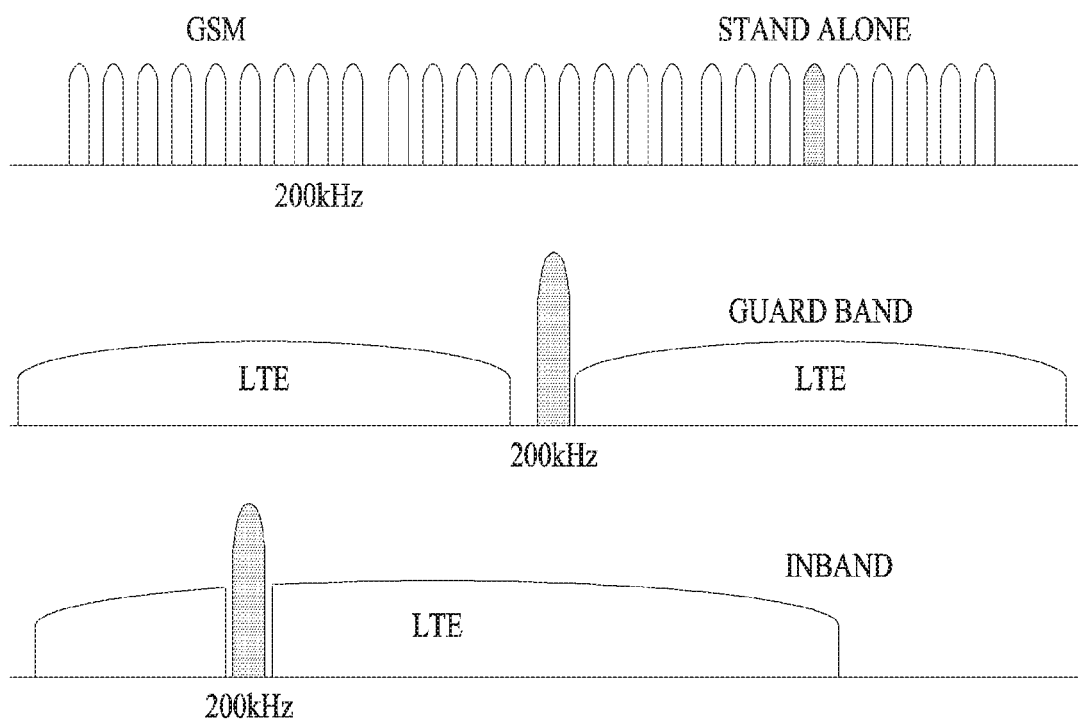
FIG. 1 is a diagram illustrating three modes which may be used in NB-IoT.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form.

As described above, the present invention relates to a method for transmitting a PRS used for narrowband IoT communication, that is, a Narrowband Positioning Reference Signal (NPRS) and a device therefor.

The 3GPP LTE standard supports a coverage enhancement (CE) scheme for supporting UEs, which experience very great path-loss/penetration-loss, considering installation environments of various IoT/MTC UEs. As a main scheme, a channel such as PDCCH/PDSCH transmitted to each UE and a channel such as PUSCH/PUCCH transmitted by each UE are repeatedly transmitted over a plurality of subframes or resource units (RUs) to support coverage of maximum 15 dB or more.

Particularly, the LTE NB-IoT system uses a bandwidth of 180 kHz (1RB: 180 kHz=15 kHz×12 RE), and may operate in a mode such as Stand-alone operation, Guard band operation, and In-band operation (same cell-ID, different cell-ID). Also, the NB-IoT system enables Multiple PRB transmission and a base station may simultaneously use Multiple PRBs, whereas RF of NB-IoT UE enables narrowband reception (bandwidth of about 200 kHz), and hopping of multiple PRBs may be performed by RF tuning. There are a PRB dedicated for data transmission as well as a PRB to which a synchronization signal, system Information, etc. are transmitted. OFDM symbols having a normal CP are used, and a subframe includes 14 OFDM symbols.

Hereinafter, a PRS which is newly defined for NB-IoT operation is defined as NPRS. The NPRS may be defined in NB-IoT PDSCH. In the in-band operation, NB-IoT is not used for first three OFDM symbols of a subframe on the assumption that PDCCH of the LTE system is transmitted, and it is preferable that data are not transmitted to an LTE CRS position. In the in-band operation mode, the NB-IoT UE may use LTE CRS.

In the NPRS transmission scheme which will be described hereinafter, a reusable structure considering a PRS transmission scheme of the LTE system and a relation between the NPRS transmission scheme and the PRS transmission scheme will be defined.

LTE-PRS

A Positioning Reference Signal (PRS) defined in the 3GPP LTE Release-9 has been designed similarly to a cell-specific reference signal defined in the LTE Release-8. Pseudo-random QPSK sequences arranged at a spacing of 6 REs and frequency-shifted in accordance with Cell-ID, having a seed determined in accordance with Cell-ID are mapped into one OFDM symbol. The pseudo-random QPSK sequences are transmitted to OFDM symbols except OFDM symbol to which PDCCH and cell-specific reference signal are transmitted, and are shifted in a frequency domain every OFDM symbol. The PRS is transmitted at N continuous subframes (N=1, 2, 4, 6), and a transmission period of 160, 320, 640, and 1280 subframes is defined. A first one of PRS transmission subframes is determined by a function of a transmission period, a PRS subframe offset and a system frame number. A PRS bandwidth may be 1.4 MHz, 3 MHz, 5 MHz, 10 MHz, 15 MHZ, 20 MHz, or the like. When it is assumed that a transmission period is 160 ms, 6 continuous subframes may be used at a PRS bandwidth of 1.4 MHz. A long transmission period increases a UE response time. The LTE defines inter frequency measurement.

Figure 2:
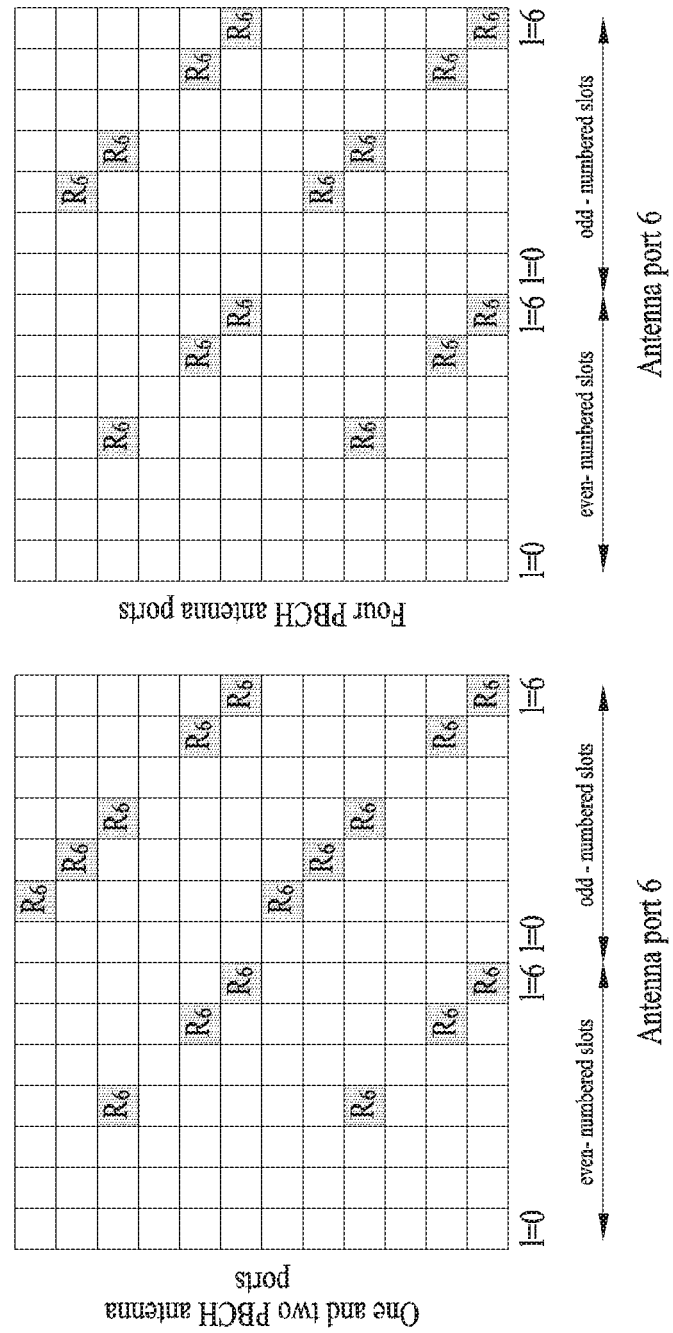
FIGS. 2 and 3 are diagrams illustrating PRS transmission patterns.
Figure 3:
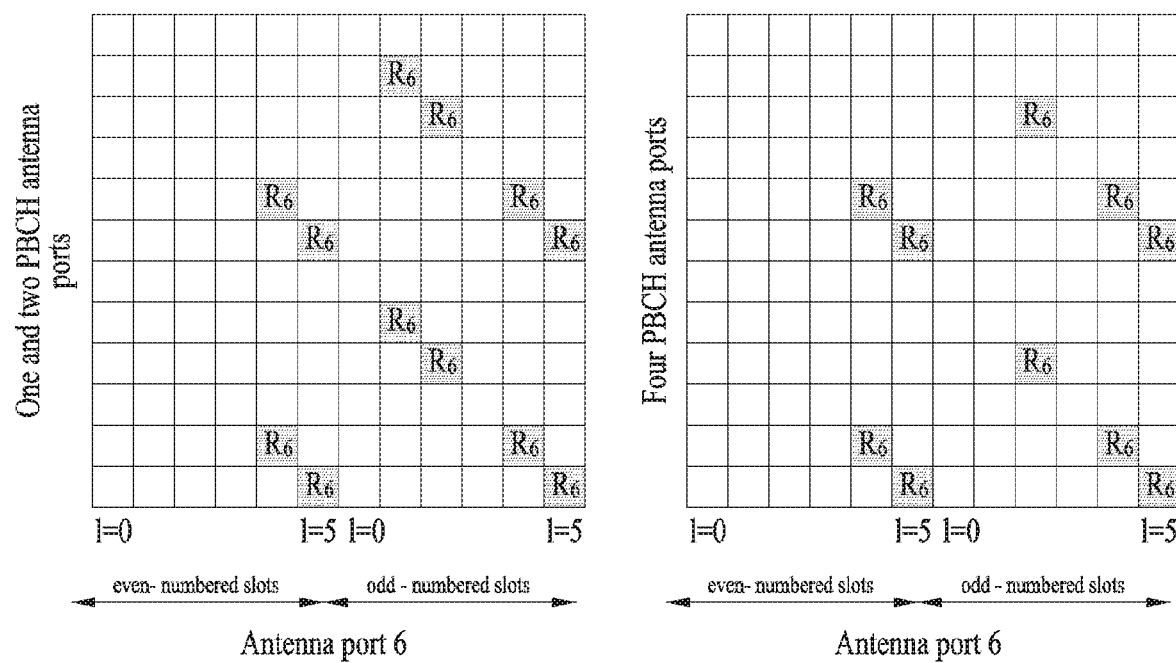

FIGS. 2 and 3 are diagrams illustrating PRS transmission patterns.

Specifically, FIG. 2 illustrates a PRS transmission pattern when a normal CP is used, and FIG. 3 illustrates a PRS transmission pattern when an extended CP is used.

The PRS is defined through a pseudo-random sequence generation Equation as follows.

$$r_{l,n_3}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In this case, $n_s$ denotes a slot number within a radio frame, 1 within the slot denotes an OFDM symbol number, and $N_{RB}^{max\_DL}$ denotes a multiple of subcarriers per RB in case of the greatest downlink bandwidth configuration.

In the Equation 1, c(i) follows a definition of pseudo-random sequence defined in the LTE, and an initial value may be defined in accordance with cell ID.

The sequence defined as above may be mapped into a complex modulation symbol $a_{k,l}^{(p)}$ as follows.

$$a_{k,l}^{(p)} = r_{l,n_3}(m') \quad \text{[Equation 2]}$$

In this case, if the normal CP is used, the following Equation is established.

$$k = 6(m + N_{RB}^{DL} - N_{RB}^{PRS}) + (6 - l + v_{shift})\bmod 6 \quad \text{[Equation 3]}$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ } PBCH \text{ antenna ports}) \\ 2, 3, 5, 6 & \text{if } n_s \bmod 2 = 1 \text{ and} \\ & (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

Meanwhile, if the extended CP is used, the following Equation is established.

$$k = 6(m + N_{RB}^{DL} - N_{RB}^{PRS}) + (5 - l + v_{shift})\bmod 6 \quad \text{[Equation 4]}$$

$$l = \begin{cases} 3, 5, 6 & \text{if } n_s \bmod 2 = 0 \\ 1, 2, 4, 5 & \text{if } n_s \bmod 2 = 1 \text{ and} \\ & (1 \text{ or } 2 \text{ } PBCH \text{ antenna ports}) \\ 2, 4, 5 & \text{if } n_s \bmod 2 = 1 \text{ and} \\ & (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

In this case, $N_{RB}^{PRS}$ which denotes a bandwidth of the PRS follows a higher layer signal, and satisfies $v_{shift} = N_{ID}^{cell} \bmod 6$.

In this way, the PRS may be transmitted as shown in FIGS. 2 and 3.

In the NB-IoT system, PRS transmission subframes are defined, and a method for using PRS transmission subframes of the LTE system in the in-band operation is suggested.

Method for Transmitting NPRS

Figure 4:
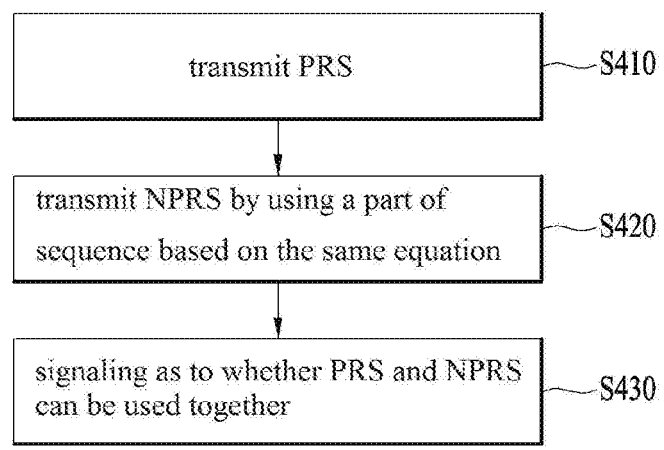
FIG. 4 is a diagram illustrating a method for transmitting NPRS in accordance with one embodiment of the present invention.

FIG. 4 is a diagram illustrating a method for transmitting NPRS in accordance with one embodiment of the present invention.

In a cellular mobile communication system that supports NB-IoT, a base station may transmit a Positioning Reference Signal (PRS) as described with reference to FIGS. 2 and 3 in transmitting a Narrowband Positioning Reference Signal (NPRS) or NB-IoT PRS (S410). This embodiment suggests that the NPRS for NB-IoT is transmitted using a sequence based on the same Equation (e.g., the Equation 1) as that of the PRS, particularly some components of the corresponding sequence to be matched with an NB-IoT operation band (S420).

In this way, the PRS and the NPRS, which are generated based on the same Equation, may be used together. Therefore, this embodiment suggests that the base station transmits information indicating whether the PRS and the NPRS can be used together to the UE if the PRS and the NPRS are transmitted through the same cell.

In a system that allows physical channels respectively defined for different RATs or various services to be multiplexed in the same carrier, if the physical channels respectively defined for different RATs or various services are multiplexed in the same carrier, and a part within a frequency resource used by a random RAT or a random physical channel is reserved by another RAT or another physical channel, a signal defined by a specific RAT or a specific physical channel may be used by being shared by another RAT or another physical channel. Particularly, if NPDSCH is allowed to be transmitted from a part of a band to which 3GPP LTE PDSCH is transmitted, a positioning reference signal (PRS) transmitted from the PDSCH may be transmitted from the NPDSCH, and the NB-IoT UE may use the PRS of the PDSCH.

A detailed method for configuring NPRS is as follows.

In one embodiment of the present invention, it is assumed that the NB-IoT PRS includes 14 OFDM symbols. Also, NB-IoT PRS subframe may be transmitted for a time period longer than a transmission period of LTE PRS subframe as much as N times. For example, if N=6, the NB-IoT system may transmit NB-IoT PRS at continuous subframes 6, 12, 24, and 36.

There may be a plurality of candidate PRBs to which NB-IoT PRS subframe may be transmitted. The PRS subframe may be transmitted to the candidate PRBs in a guard band as well as an in-band in the in-band operation mode. On the contrary, the PRS subframe transmission may also be indicated in a guard band and an in-band of the guard band operation mode. A candidate carrier to which the PRS subframe may be transmitted may be designated even in case of the stand-along operation mode.

NB-IoT base station may set NB-IoT PRS subframe transmission period per indicated candidate PRB or candidate carrier. The NB-IoT UE may receive NB-IoT PRS subframe in one PRB, and may receive NB-IoT PRS subframe transmitted from inter-PRB between NB-IoT PRS subframe transmission periods transmitted from the corresponding PRB.

If the NB-IoT UE intends to receive NB-IoT PRS subframes from a plurality of PRBs or a plurality of carriers, it may be assumed that a switching time from a reference band or carrier to inter-band or inter-carrier and a switching time from inter-band or inter-carrier to reference band or carrier are required, and a PRS is received from the NB-IoT PRS subframe at a length of NB-IoT PRS subframe transmitted from inter-band or inter-carrier, which is shorter than a length of NB-IoT PRS subframe transmitted from reference band or reference carrier as much as N subframe (e.g., one subframe at the front and one subframe at the rear—total two subframes). When the NB-IoT PRS subframe is transmitted to a plurality of bands or a plurality of carriers in the NB-IoT system, it is preferable that the number of NB-IoT PRS subframes transmitted from reference band or reference carrier is set to be greater than N subframes. That is, if NB-IoT PRS subframes are transmitted from a plurality of PRBs or a plurality of carriers, and the NB-IoT UE receives NB-IoT UE PRS subframes by switching a plurality of bands or a plurality of carriers, the PRS may be received for the length of the NB-IoT PRS subframe indicated by the reference band or the reference carrier. Afterwards, it is assumed that the NB-IoT UE receives NB-IoT PRS for a time period shorter than a length of a subframe designated at which NB-IoT PRS subframe of inter-band or inter-carrier will be transmitted, on the assumption that each of the switching time to inter-band or inter-carrier and the switching time to the reference band or the reference carrier is included in the NB-IoT PRS subframe reception time of the inter-band or the inter-carrier.

It is assumed that NB-IoT PRS is transmitted from 14 OFDM symbols in a PRB of stand-alone carrier and guard band and overlap of LTE PDCCH (assumption of 3 OFDM symbols) and LTE CRS (1Tx, 2Tx, 4Tx) is avoided in the in-band.

The NB-IoT PRS is arranged at two of 12 REs, and two PRSs have a spacing of 6 REs on a frequency. (For example, 0-6, 1-7, 2-8, 3-9, 4-10, 5-11, etc.). The corresponding position is frequency-shifted in accordance with Cell-ID. Also, the NB-IoT PRS has a pattern repeated in a unit of 7 OFDM symbols. That is, a frequency position k is expressed as k=6×m+(6−n+vshift) mod 6, wherein m=0,1 if the number of PRSs per OFDM symbol is 2, and n=0, 1, 2, 3, 4, 5, 6 if the number of OFDM symbols per slot is 7, and vshift=Ncell-ID mod 6 determined in accordance with cell-id may be expressed. As a sequence used for the NB-IoT PRS, a pseudo-random sequence defined in the LTE system is used, and a seed of sequence generation is determined by a function of a slot number (ns=0, 1, . . . , 19), OFDM symbol number (n=0, 1, 2, . . . , 6), cell ID and CP length.

One embodiment of the present invention suggests that a sequence corresponding to a PRB position is used in case of an in-band operation mode and a sequence is used on the assumption that a PRB position is fixed in case of a stand-alone operation mode.

Figure 5:
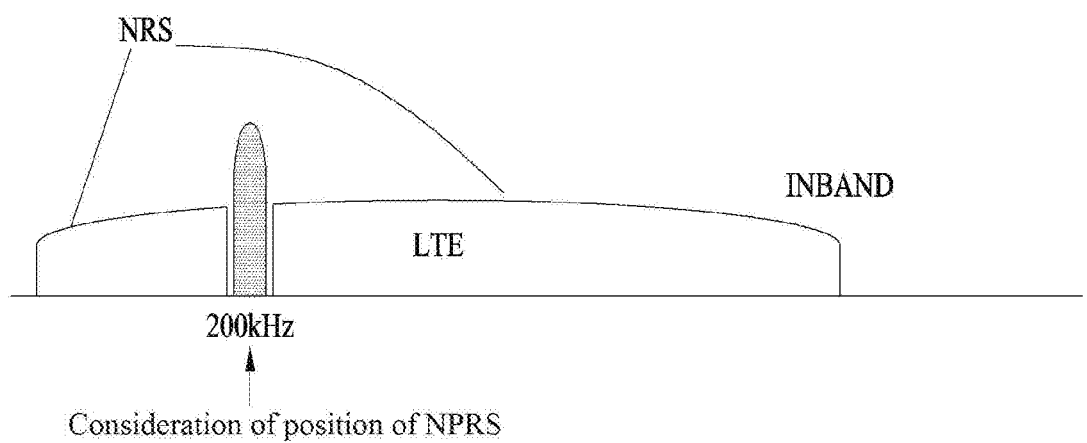
FIG. 5 is a diagram illustrating a configuration of NPRS per NB-IoT operation mode in accordance with one embodiment of the present invention.

FIG. 5 is a diagram illustrating a configuration of NPRS per NB-IoT operation mode in accordance with one embodiment of the present invention.

As described above with reference to FIG. 1, NB-IoT operation includes an in-band mode operated by being included in an LTE band, a guard band mode, and a stand-alone operation mode independently existing from the LTE band. In this embodiment described as above, it is assumed that a generation equation of NPRS is configured using the same generation equation of PRS. In this state, this embodiment suggests that NPRS is configured using a partial component (two components per symbol) of a sequence considering a position of PRB to which NPRS is transmitted in case of an in-band mode. In this way, in the in-band operation, NPRS is used for measurement together with PRS considering NPRS transmission PRB position to improve throughput.

However, in case of the guard band mode or the stand-alone mode, since consideration of a position to which NPRS is transmitted is not required as described above, two components per symbol may be extracted regardless of NPRS transmission position, whereby the NPRS may be configured.

Meanwhile, the NB-IoT PRS may be arranged at 4 of 12 REs, and 4 PRSs may have a spacing of three REs on a frequency. Frequency shift may be performed in accordance with cell-ID.

In accordance with the above method, the NPRS may be transmitted by resource mapping as follows in one embodiment of the present invention.

First of all, if the NB IoT operation is performed in the in-band mode, the NPRS may be subjected to resource mapping as follows.

$$k = 6m + (6 - l + v_{shift}) \bmod 6 \quad \text{[Equation 5]}$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ } PBCH \text{ antenna ports}) \\ 2, 3, 5, 6 & \text{if } n_s \bmod 2 = 1 \text{ and} \\ & (4 \text{ } PBCH \text{ antenna ports}) \end{cases}$$

$$m = 0, 1$$

$$m' = m + 2n'_{PRB} + N_{RB}^{max,DL} - \tilde{n}$$

In this case, $n'_{PRB}$ denotes a position of a PRB which includes NPRS transmitted through higher layer signaling. Also, if $N_{RB}^{DL}$ is an odd number, $\tilde{n}=1$ may be defined, and if $N_{RB}^{DL}$ is an even number, $\tilde{n}=0$ may be defined.

Also, if the NB IoT operation is performed in the guard band mode or the stand-alone mode, the NPRS may be subjected to resource mapping as follows.

$$k=6m+(6-l+v_{shift}) \bmod 6$$

$$l=0,1,2,3,4,5,6$$

$$m=0,1$$

$$m'=m+N_{RB}^{max,DL}-1 \quad \text{[Equation 6]}$$

That is, if the NB IoT operation is performed in the guard band mode or the stand-alone mode, NPRS transmission symbols may be used from the first symbol, and the sequence may be defined regardless of a PRB position for transmitting NPRS.

For the NB-IoT PRS, the base station may deliver PRS transmission related information to the UE, wherein the corresponding information may include a subframe length, a subframe period, a subframe offset, etc. Also, ID information used for RE mapping of the NB-IoT PRS and sequence determination may be different from ID applied to another channel of the corresponding NB-IoT PRB, and may be notified independently.

Also, the base station may deliver PRS transmission information transmitted from a neighbor cell to the NB-IoT UE, wherein each information may indicate a subframe length, a subframe period, a subframe offset, and an NB-IoT PRS transmission PRB position in conjunction with the corresponding Cell-ID.

In one embodiment of the present invention, the NB-IoT UE may expect that a normal subframe of NB-IoT is not transmitted to a subframe to which LTE PRS is transmitted.

Also, it may indicate that NB-IoT PRS is transmitted to a subframe to which LTE PRS is transmitted, or may indicate that LTE PRS is transmitted from a subframe to which NB-IoT PRS is transmitted.

In one embodiment of the present invention, the base station may indicate, to the NB-IoT UE, an operation mode of NB-IoT within a band used by the LTE system. Alternatively, the base station may indicate a PRB, which can be used for channel and signal for NB-IoT, among PRBs within a band of the LTE system. At this time, the base station may indicate a PRB to which NB-IoT PRS can be transmitted, and the NB-IoT UE may perform measurement by using a PRS transmitted from the corresponding PRB.

The NB-IoT UE may expect that NB-IoT PRS subframe is not transmitted from LTE PRS subframe in the in-band operation (case that Cell-ID is different from that of LTE). Particularly, this scheme may be applied such that NPRS (NB-IoT PRS) may not be transmitted from a serving cell at a corresponding subframe if the serving cell notifies the NB-IoT UE of LTE PRS subframe information on a neighbor cell not the serving cell.

In the above embodiment, the number of NB-IoT PRS transmission subframes may be more than the number of LTE PRS transmission subframes, and some or all subframes of the LTE PRS transmission subframes may be overlapped with the time when NB-IoT PRS transmission subframes are transmitted. The base station may notify the NB-IoT UE of the presence of the LTE PRS transmission subframes.

Also, in the above embodiment, the base station may provide the UE with information on LTE PRS subframes. (e.g., cell-ID, subframe length, period, offset, bandwidth). Also, the base station may provide LTE PRS subframe information of the neighbor cell. The UE may use LTE PRS for positioning measurement, and the base station may notify the UE whether the LTE PRS may be used for measurement together with the NB-IoT PRS. Alternatively, if the base station notifies the UE of information on the LTE PRS, the UE may recognize that the LTE PRS may be used for measurement together with the NB-IoT PRS. This operation may be applied to the case that LTE PRS and NB-IoT PRS are comprised of the same PRS ID and/or the same cell ID and/or the same v shift. At this time, RE mapping of the NB-IoT PRB and a sequence generation rule according to PRB position on a frequency axis may follow the LTE PRS.

Neighbor cell NBPRS PRB may be assumed to be the same as that of the serving cell, PRS may be shifted in accordance with cell ID, or PRS offset information compared with the serving cell may be used.

In one embodiment of the present invention, the NB-IoT UE may use a CRS for measurement. As conditions which can be used, the NB-IoT UE may use a CRS of the legacy LTE included in the subframe in case of the in-band operation mode.

In the above embodiment, Node-B in a status of intra-band (that is, the same center between cells) provides neighbor cell Cell-ID to be measured and PRS information (subframe length, period, offset, PRB information) of the neighbor cell regarding PRS. At this time, whether LTE CRS included in the in-band can be used may be notified. Alternatively, the UE operating in the in-band operation mode may use the CRS for measurement on the assumption that the CRS is equally transmitted even from the neighbor cell.

In the above embodiment, when the NB-IoT UE uses the legacy CRS for measurement, one of two CRS ports that may be included in one OFDM symbol may be used for measurement.

In another embodiment of the present invention, a signal defined in the NB-IoT may be used as the PRS.

For example, if a Narrowband Secondary Synchronization Signal (NSSS) may be used as the PRS, candidate anchor PRB information (or information on PRB to which NSSS is transmitted) of the serving cell and corresponding NSSS sequence (or NB cell ID) and same information on the neighbor cell may be transmitted to the UE. At this time, the base station may indicate whether the NSSS included in in-band can be used.

Various Reference Signals for NB-IoT Operation and Relation Between the Reference Signals Meanwhile, hereinafter, various reference signals, which can be used for NB-IoT operation, as well as the aforementioned NPRS will be described and a relation between the signals will be discussed.

First of all, in the NB IoT system, a Narrowband Reference Signal (NRS) has been newly defined for data demodulation and channel measurement, and the base station may indicate absolute value information of a power of the NRS. Also, the embodiment of the present invention suggests that the NRS is always transmitted regardless of each mode, particularly LTE CRS is additionally used for data demodulation together with the NRS in in-band operation. At this time, a problem may occur in that a size value of an estimated channel is varied due to a power difference between the NRS and the LTE CRS. To solve this problem, power ratio information of the NRS and the LTE CRS may be indicated.

Figure 6:
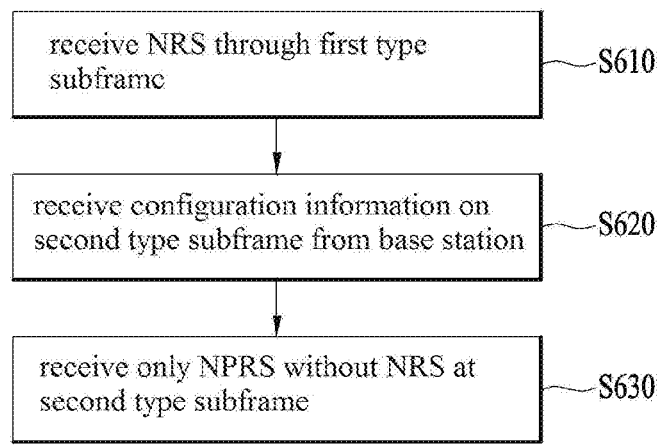
FIG. 6 is a diagram illustrating a method for receiving NB-IoT downlink reference signals in a UE in accordance with one embodiment of the present invention.

FIG. 6 is a diagram illustrating a method for receiving NB-IoT downlink reference signals in a UE in accordance with one embodiment of the present invention.

First of all, the UE may receive the NRS through first type subframe(s) through a downlink (S610). The first type subframe(s) for receiving the NRS may be predefined subframes, or configuration information of the first type subframe may be received through system information.

Meanwhile, the UE may receive configuration information on second type subframe(s), which can receive the NPRS, through a higher layer (S620). Therefore, the UE receives the NPRS at the second type subframe. Even though the second type subframe according to second type subframe configuration information is partially overlapped with the first type subframe, the UE may be operated on the assumption that the NPRS is only received at the corresponding subframe and the NRS is not received. That is, the UE may be operated on the assumption that the NPRS is only received at the second type subframe (S630).

The NRS may be used for demodulation of NPDCCH/NPDSCH. Therefore, the first type subframe may be referred to as a normal subframe in NB-IoT operation or DL valid subframe. In the configuration of the general subframe and the configuration of the second type subframe for NPRS transmission, it is preferable to give a priority to the second type subframe. Therefore, in one embodiment of the present invention, it is defined that the NRS is not transmitted at a subframe according to configuration information of the second type subframe.

That is, the NB-IoT UE may expect that a normal subframe of NB-IoT is not transmitted to a subframe to which NB-IoT PRS is transmitted, and a detailed operation example is as follows.

It is preferable that NRS (or NPDCCH/NPDSCH) is not transmitted to a subframe configured to allow NPRS (NB-IoT PRS) to be transmitted thereto even though the subframe is configured as a DL valid subframe (subframe to which NRS is transmitted and to which NPDCCH/NPDSCH can be transmitted) of NB-IoT.

Alternatively, it is preferable that the NPRS is not transmitted to a subframe configured as a DL valid subframe even though the subframe is configured as a subframe to which the NPRS is transmitted.

Particularly, if NPDCCH/NPDSCH is scheduled to be repeatedly transmitted N times through a plurality of DL valid subframes which include the subframe to which the NPRS is transmitted, the UE may operate by understanding that the NPDCCH/NPDSCH is transmitted through N DL valid subframes except the corresponding subframe.

The DL valid subframe of NB-IoT is a subframe used for DL transmission of NB-IoT, and may be used as a normal subframe of NB-IoT, to which NPDCCH/NPDSCH/NRS is transmitted, or a subframe to which NPRS is transmitted.

Also, the NB-IoT UE may expect that LTE CRS is not transmitted to the subframe to which the NB-IoT PRS is transmitted.

Power Ratio of NRS and NPRS

If the NPRS and additional signals are used for measurement in NB IoT, a problem may occur in that exactness of a measured value is reduced due to a power difference between the NPRS and the corresponding signals. To solve this problem, information on a power between the NPRS and the corresponding signal is required to use corresponding information.

For example, PRS_RA may be defined (PRS-to-RS EPRE ratio for the PRS in all transmitted OFDM symbols not containing CRS).

Also, a power ratio for the NRS and the NPRS is defined, wherein the power ratio may be configured by offset of several steps.

NRS, LTE CRS, etc. may be transmitted to the subframe to which the NPRS is transmitted, and it is preferable that data are not transmitted to the corresponding subframe.

A power (or energy) ratio of RE included in OFDM symbol to which NRS is not transmitted, as compared with NRS power (or energy), may be defined and indicated. At this time, since the NPRS is transmitted to the OFDM symbol to which the NRS is not transmitted, a transmission power ratio of the NPRS may be identified indirectly.

It is assumed that a power of RE included in OFDM symbol to which LTE CRS is transmitted from PRB allocated for NB IoT transmission is equal to a power of RE included in OFDM symbol to which LTE CRS and NRS are not transmitted.

If the LTE CRS is transmitted to the OFDM symbol to which the NPRS is transmitted, it is assumed that a transmission power of the NPRS included in the corresponding OFDM symbol is equal to the power of RE included in the OFDM symbol to which LTE CRS and NRS are not transmitted. In this case, it is assumed that the same NPRS transmission power is applied to the symbol to which the CRS is transmitted or the symbol to which the CRS is not transmitted.

It is preferable that the NRS is not transmitted from the band or subframe to which the NPRS is transmitted.

A transmission power for RE of OFDM symbol to which the NPRS is transmitted may be defined by a ratio for a power (or energy) of the NRS of the OFDM symbol included in the band or subframe to which the NRS is transmitted.

Also, in one embodiment of the present invention, a transmission power ratio of NPRS to other signals may be defined.

The transmission power ratio of the NPRS to other signals, such as NRS, LTE CRS, NPSS, NSSS, and LTE PRS, which may be used for measurement for positioning together with the NPRS, may be defined. For example, if the NPRS is used together with the existing LTE PRS, a transmission power ratio of two channels may previously be defined (e.g., the UE assumes that transmission powers of two channels are equal to each other), or the base station may indicate a transmission power ratio of two channels or a transmission power of each channel. For another example, when the NB IoT UE may receive information on LTE CRS transmitted within the band used for the legacy LTE transmission from the network, the NB IoT UE may indicate the transmission power ratio of the NPRS and the LTE CRS or a transmission power of each channel.

The power of the NRS may be limited to the power of the NRS transmitted to an anchor PRB to which the NB-IoT UE can initially access.

As described above, the power ratio may be defined and then delivered to the UE through SIB or RRC signaling.

Apparatus Configuration

Figure 7:
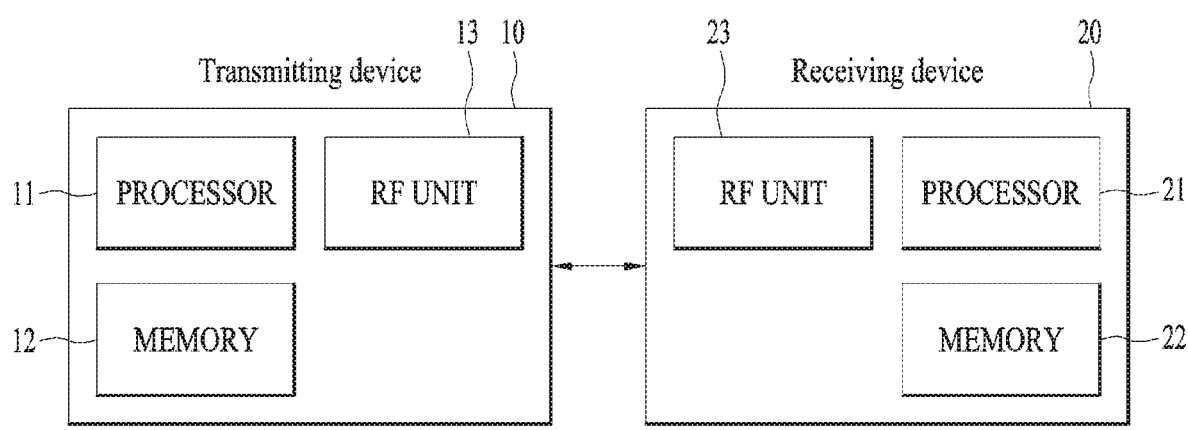
FIG. 7 is a block diagram illustrating elements of a transmitting device 10 and a receiving device 20, which implement the present invention.

FIG. 7 is a block diagram showing the components of a transmitting device 10 and a receiving device 20 for performing embodiments of the present invention.

The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 operatively connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer.

The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing embodiments of the present invention by hardware, application specific integrated circuits (ASICs), Digital signal processors (DSPs), digital signal processing devices (DSPDs), programmable logic devices (PLDs), field programmable gate arrays (FPGAs), etc. configured to perform embodiments of the present invention may be included in the processors 11 and 21. If operations or functions of embodiments of the present invention are implemented by firmware or software, firmware or software may be configured to include modules, procedures, functions, etc. for performing the functions or operations of embodiments of the present invention. The firmware or software configured to perform embodiments of the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include $N_t$ ($N_t$ being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include $N_r$ ($N_r$ being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

Each of the RF units 13 and 23 includes one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antennal elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink. Hereinafter, the processor, the RF unit and the memory included in the UE are respectively referred to as a UE processor, a UE RF unit and a UE memory and the processor, the RF unit and the memory included in the eNB are respectively referred to as an eNB processor, an eNB RF unit and an eNB memory.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The invention described as above may be applied to various wireless communication systems, which support a narrowband communication to provide IoT services, as well as a wireless communication system which provides IoT services based on an LTE system.

What is claimed is:

1. A method for transmitting a narrowband positioning reference signal (NPRS) from a base station in a cellular mobile communication system supporting narrowband-Internet of Things (NB-IoT), the method comprising:
   transmitting a positioning reference signal (PRS) by using a first sequence defined by a first equation;
   transmitting the NPRS by using a part of a second sequence defined by the first equation; and
   transmitting, to a UE, information on whether the PRS and the NPRS can be used together when the PRS and the NPRS are transmitted through the same cell,
   wherein the part of the second sequence is differently determined based on whether the cell is operated in an in-band mode or in a stand-alone mode.

2. The method of claim 1, wherein the NPRS is transmitted using a first part of the second sequence determined by using a position of a physical resource block (PRB) for the NPRS, if the cell is operated in the in-band mode, and
   wherein the NPRS is transmitted using a second part of the second sequence determined not using the position of the PRB, if the cell is operated in the stand-alone mode.

3. The method of claim 2, wherein the NPRS is transmitted per symbol by extracting two components of the sequence.

4. The method of claim 2, further comprising transmitting position information of the PRB to the UE.

5. The method of claim 1, wherein the NPRS is transmitted per symbol from a first symbol of a first subframe if the cell is operated in the stand-alone mode or a guard band mode, and the NPRS is transmitted from a symbol except first one or more predetermined number of symbols of a second subframe if the cell is operated in the in-band mode.

6. The method of claim 1, wherein, when a frequency domain position to which the NPRS is transmitted is k,
   $k=6m+(6-l+v_{shift})\mod 6$ is satisfied, where m is 0 or 1, 1 denotes a symbol index to which the NPRS is transmitted, and $v_{shift}$ is determined based on ID of a cell to which the NPRS is transmitted.

7. The method of claim 1, wherein the first equation is a pseudo-random sequence generation equation in which an initial value is determined by an identifier of the cell.

8. A method for receiving a narrowband positioning reference signal (NPRS) by a user equipment (UE) from a base station in a cellular mobile communication system supporting narrowband-Internet of Things (NB-IoT), the method comprising:
- receiving, from the base station, a positioning reference signal (PRS) corresponding to a first sequence defined by a first equation;
- receiving, from the base station, the NPRS corresponding to a part of a second sequence defined by the first equation; and
- performing position estimation by using the PRS and the NPRS based on information on that the PRS and the NPRS can be used together being received from the base station,
- wherein the part of the second sequence is differently determined based on whether the cell is operated in an in-band mode or in a stand-alone mode.

9. The method of claim 8, wherein the NPRS is received using a first part of the second sequence determined by using a position of a physical resource block (PRB) for the NPRS, if the cell is operated in the in-band mode, and
- wherein the NPRS is received using a second part of the second sequence determined not using the position of the PRB, if the cell is operated in the stand-alone mode.

10. The method of claim 9, wherein the NPRS corresponds to two components of the sequence, and is transmitted per symbol.

11. The method of claim 9, further comprising receiving position information of the PRB from the base station.

12. The method of claim 8, wherein the NPRS is received per symbol from a first symbol of a first subframe if the cell is operated in the stand-alone mode or a guard band mode, and the NPRS is received per symbol from a symbol except first one or more predetermined number of symbols of a second subframe if the cell is operated in the in-band mode.

13. The method of claim 8, wherein, when a frequency domain position to which the NPRS is received is k, $k=6m+(6-l+v_{shift}) \mod 6$ is satisfied, where m is 0 or 1, 1 denotes a symbol index to which the NPRS is received, and $v_{shift}$ is determined based on ID of a cell to which the NPRS is received.

14. A base station for transmitting a narrowband positioning reference signal (NPRS) in a cellular mobile communication system supporting narrowband-Internet of Things (NB-IoT), the base station comprising:
- a processor configured to configure a positioning reference signal (PRS) by using a first sequence defined by a first equation and configure the NPRS by using a part of a second sequence defined by the first equation; and
- a transceiver configured to transmit the PRS and the NPRS to one or more user equipments, UEs,
- wherein the processor is configured to transmit, to the UE, information on whether the PRS and the NPRS can be used together, through the transceiver, when the PRS and the NPRS are transmitted through the same cell,
- wherein the processor differently determines the part of the second sequence based on whether the cell is operated in an in-band mode or in a stand-alone mode.

15. A user equipment (UE) for receiving a narrowband positioning reference signal (NPRS) from a base station in a cellular mobile communication system supporting narrowband-Internet of Things (NB-IoT), the UE comprising:
- a transceiver configured to receive, from the base station, a positioning reference signal (PRS) corresponding to a first sequence defined by a first equation and receive, from the base station, the NPRS corresponding to a part of a second sequence defined by the first equation; and
- a processor configured to perform position estimation by using the PRS and the NPRS based on information on that the PRS and the NPRS can be used together being received from the base station through the transceiver,
- wherein the part of the second sequence is differently determined based on whether the cell is operated in an in-band mode or in a stand-alone mode.

* * * * *